US005408689A

United States Patent [19]

Aneha

[11] Patent Number: 5,408,689

[45] Date of Patent: Apr. 18, 1995

[54] RADIO CONTROL TRANSMITTER FOR USE WITH A MODEL TOY UNIT AND INCLUDING VARIABLY SELECTABLE OPERATION FUNCTION MODES

[75] Inventor: Akira Aneha, Mobara, Japan

[73] Assignee: Futaba Denshi Kogyo Kabushiki Kaisha, Mobara, Japan

[21] Appl. No.: 22,395

[22] Filed: Feb. 24, 1993

Related U.S. Application Data

[63] Continuation of Ser. No. 550,575, Jul. 10, 1990, abandoned.

[30] Foreign Application Priority Data

Jul. 13, 1989 [JP] Japan .............................. 1-81696 U

[51] Int. Cl.[6] .............................................. H04B 1/04

[52] U.S. Cl. ........................................ 455/91; 455/92; 455/353; 359/142

[58] Field of Search .................... 455/91, 92, 101–103, 455/352, 353; 340/825.69, 825.72; 358/194.1, 348, 734; 359/142, 145, 146, 147, 148

[56] References Cited

U.S. PATENT DOCUMENTS

| | | | |
|---|---|---|---|
| 4,712,105 | 12/1987 | Köhler | 340/825.69 |
| 4,866,434 | 9/1989 | Keenan | 340/825.69 |

FOREIGN PATENT DOCUMENTS

| | | | |
|---|---|---|---|
| 61-81033 | 4/1986 | Japan | 455/92 |
| 62-176293 | 8/1987 | Japan | 455/92 |

*Primary Examiner*—Reinhard J. Eisenzopf
*Assistant Examiner*—Chi H. Pham
*Attorney, Agent, or Firm*—Oblon, Spivak, McClelland, Maier & Neustadt

[57] ABSTRACT

A radio control transmitter capable of selecting function modes of high frequency in use at a simple operation to highly improve the operating efficiency. A plurality of setting switches each are provided so as to exhibit two functions or the function of immediately calling a specified function mode and a normal setting function, which are changed over through a second switch.

2 Claims, 2 Drawing Sheets

RADIO CONTROL TRANSMITTER FOR USE WITH A MODEL TOY UNIT AND INCLUDING VARIABLY SELECTABLE OPERATION FUNCTION MODES

This application is a continuation of application Ser. No. 07/550,575, filed on Jul. 10, 1990, now abandoned.

BACKGROUND OF THE INVENTION

This invention relates to a radio control transmitter, and more particularly to a radio control transmitter for both industrial applications and a model.

In general, a transmitter for a radio control device is constructed so as to invoke or call a desired mode from a plurality of function modes to set a datum for the purpose of an adjusting operation such as the setting of operation range of a stick or the like, the setting of operational characteristics of the stick, or the like.

Conventionally, there is known a radio control transmitter of the type which is constructed so as to exhibit the function of permitting the number or name of functions to be input thereto by means of a key in order to call a desired function mode through a key operation. Also, a conventional control transmitter of another type is known which is adapted to call a desired function mode by moving a cursor being used for indication to a place at which the name of the function mode is indicated.

Unfortunately, the conventional radio control transmitter is highly complicated in key operation carried out for calling a function mode, resulting in operating efficiency being substantially deteriorated. In particular, in the conventional radio control transmitter, only a part of a number of function modes is used with high frequency. If at least such function modes of high frequency in use can be selected at a simple operation, efficiency in the operation of setting a data or the like would be substantially improved.

SUMMARY OF THE INVENTION

The present invention has been made in view of the foregoing disadvantage of the prior art.

Accordingly, it is an object of the present invention to provide a radio control transmitter which is capable of highly improving the operating efficiency.

It is another object of the present invention to provide a radio control transmitter which is capable of immediately calling a desired function mode at a minimum key operation.

In accordance with the present invention, a radio control transmitter including a plurality of function modes selectable as desired is provided. The transmitter comprises a plurality of setting means operated to carry out selection of the function modes and setting of a data in the function mode selected and a changing-over means for changing over the operation mode of the setting means from a normal operation mode to a second operation mode. The setting means is constructed so as to exhibit the function of executing the selection of the function modes and the setting of the data in the normal operation mode and exhibiting the function of executing the selection of a particular function mode through one operation in the second operation mode.

In the present invention constructed as described above, the setting means are operated in the normal operation mode, to thereby carry out the selection of the function modes, resulting in setting the data.

When it is desired that a specified function mode is immediately selected from a plurality of the function modes, the operation mode of the setting means is changed over from the normal operation mode to the second operation mode by means of the changing-over means and then the specified function mode is selected by means of the setting means.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a radio control transmitter according to the present invention will be described hereinafter with reference to the accompanying drawings.

Figure 1:
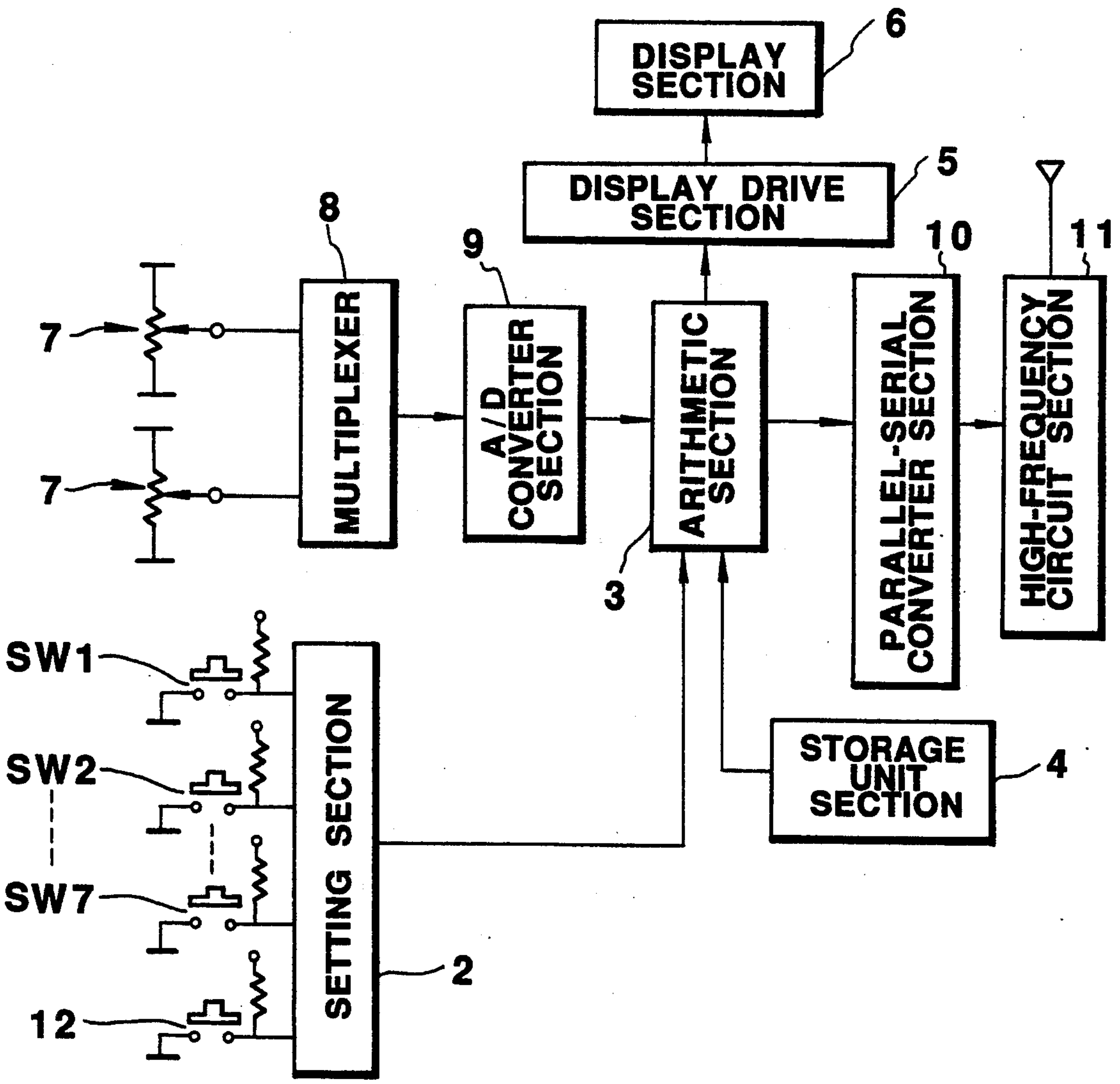
FIG. 1 is a block diagram showing an embodiment of a radio control transmitter according to the present invention.
Figure 2:
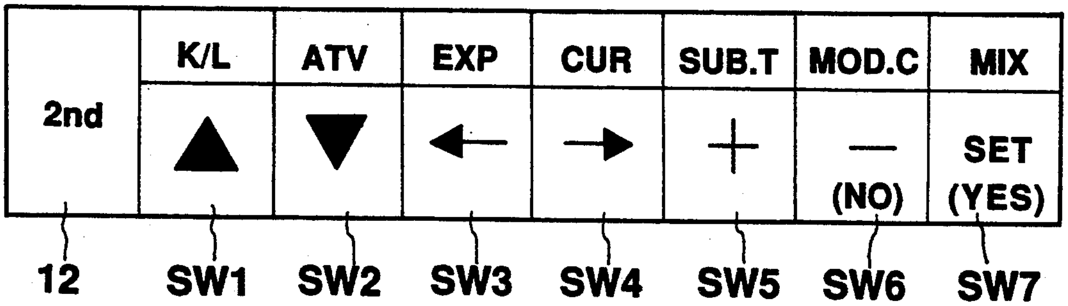
FIG. 2 is a view showing a switch arrangement in the radio control transmitter of FIG. 1.
Figure 3:
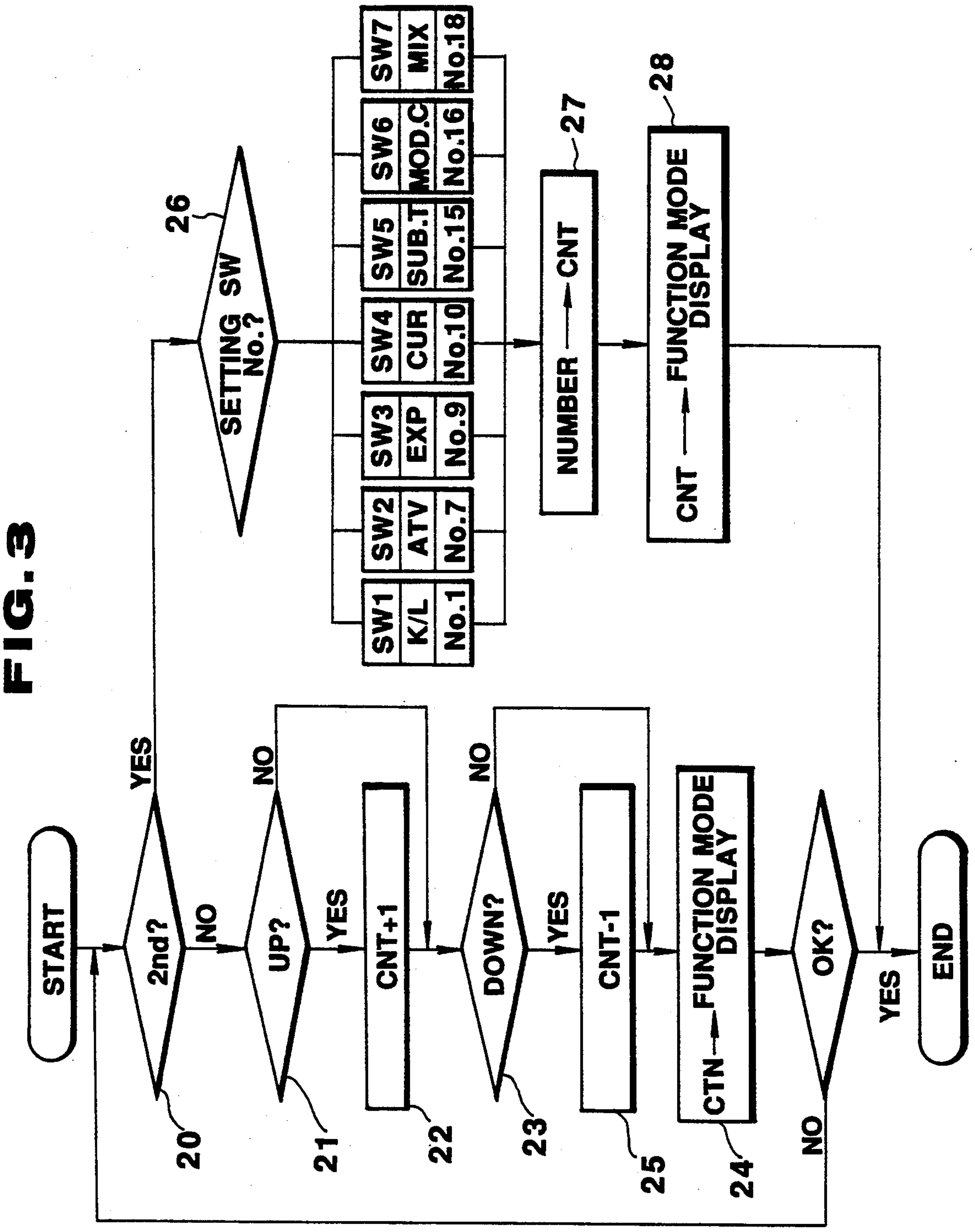
FIG. 3 is a flow chart showing the function of the radio control transmitter of FIG. 1.

FIGS. 1 to 3 show an embodiment of a radio control transmitter according to the present invention. A radio control transmitter of the illustrated embodiment generally designated at reference numeral 1 includes a plurality of function modes which can be selected as desired and is adapted to set various data necessary for control in each of the function modes as desired. More particularly, the radio control transmitter 1 of the illustrated embodiment, as shown in FIG. 1, is so constructed that various data set in a setting section 2 which includes various kinds of setting switches and the like which will be described hereinafter are stored through an arithmetic section 3 into a storage unit section 4 and displayed in a display section 6. Then, an operation signal supplied from a stick 7 which serves as a means for operating an object to be controlled is converted into a serial signal at every channel through a multiplexer 8, subject to A/D conversion in an A/D converter section 9 and then input to the arithmetic section 3. A signal output from the A/D converter 9 and the above-described data previously set are subject to processing in the arithmetic section 3 according to a program stored in advance in the storage unit section 4, converted into a series signal in a parallel-serial converter section 10, and then modulated and output through a high-frequency circuit section 11.

As shown in FIG. 1, the setting section 2 includes seven setting switches SW1 to SW7 constituting a setting means and a second switch 12 serving as a changing-over means for changing over the operation mode of each of the setting switches. The setting switches SW1 to SW7, as shown in FIGURE 2, each are adapted to exhibit two functions. More particularly, each of the setting switches SW1 to SW7 is used to execute two functions different from each other in two operation modes or a normal operation mode and a second operation mode which are changed over by the second switch 12, respectively.

In the normal operation mode, the setting switches SW1 to SW7 exhibit functions indicated on a lower stage in FIG. 2, respectively. More particularly, the setting switches SW1 and SW2 each are adapted to carry out a vertical scroll function for scrolling various function modes, the setting switches SW3 and SW4 each are adapted to exhibit the function of selecting a channel in each of the function modes, the setting switches SW5 and SW6 function to vary the amount of setting in each of the function modes, and the setting switch SW7 functions as a set switch.

Also, the setting switches SW1 to SW7 each are constructed so as to immediately select specified function modes indicated on an upper stage in FIG. 2, when the setting switches SW1 to SW7 each are pushed after the operation mode of the switch is changed over from the normal operation mode to the second operation mode through the second switch 12. Of a number of function modes which the radio control transmitter of the illustrated embodiment possesses, such specified function modes have particularly high frequency in use. More specifically, the setting switch SW1 indicates a key lock (K/L) mode and the setting switch SW2 indicates an adjustable travel volume (ATV) mode for setting a maximum operation range of a servo with respect to a maximum movable range of the stick. The setting switch SW3 exhibits an exponential (EXP) mode for exponentially setting the operation characteristics of a stick for steering or a ladder and the setting switch SW4 exhibits a CUR mode for exponentially setting the operation characteristics of a stick for a throttle. The setting switch SW5 exhibits a sub-trim (SUB. T) mode for setting the neutral position of the stick and the setting switch SW6 exhibits a model recall (MOD. C) mode for calling data stored. The setting switch SW7 indicates a mixing (MIX) mode.

Now, the manner of operation of calling the function modes constructed as described above will be described hereinafter with reference to FIG. 3.

The transmitter of the illustrated embodiment is constructed so as to exhibit twenty (20) kinds of function modes, which are assigned a series of set item numbers. Now, supposing that the above-described function modes selected in the second operation mode are previously assigned numbers shown in FIG. 3, the description will be made with respect to an example wherein in the normal operation mode, a desired function mode is selected while scrolling a display and indicated in the display section 6.

This may be carried out according to any one of the following two kinds of procedures.

The first procedure is that the setting switch SW1 for counting-up is pushed, the function modes are scrolled in a direction in which the set item numbers are counted up, and the scrolling is stopped at a time when a desired function mode is displayed.

More particularly, in FIG. 3, when it is judged in a step 20 that the second switch 12 is not pushed, it is judged in a step 21 whether the setting switch SW1 is pushed, resulting in the counting-up. When it is judged that the counting-up is carried out, one (1) is added to a counter of the setting section 2 in a step 22. Then, in a step 23, it is judged whether the setting switch SW2 for counting-down is pushed; and when it is not pushed, a step 24 causes a function mode of the number in the counter of the setting section 2 to be displayed in the display section 6. Subsequently, the scrolling operation in the counting-up direction by the setting switch SW1 is continued until a desired function mode is displayed.

The second procedure is that the setting switch SW2 for the counting-down is pushed, the function modes are scrolled in a direction in which the set item number is counted down and the scrolling is stopped when a desired function mode is displayed.

More particularly, in FIG. 3, when it is judged in the step 20 that the second switch 12 is not pushed, it is judged in the step 21 whether the setting switch SW1 is pushed for the counting-up. When it is judged that it is not pushed, it is judged in the step 23 that the setting switch SW2 is pushed for the counting-down. When the setting switch SW2 for the counting down is pushed, one (1) is subtracted from the counter of the setting section 2 in a step 25 and the step 24 causes a function mode corresponding to the number of the counter to be displayed in the display section 6. Subsequently, the scrolling operation in the counting-down direction by the setting switch SW2 is continued until a desired function mode is displayed.

Now, the manner of selection of some function modes of high frequency in use which is carried out through one key operation in the second operation mode will be exemplified hereinafter.

First, when it is judged in the step 20 that the second switch 12 is pushed, it is then determined in a step 26 that which setting switch is pushed. Then, in a step 27, a set item number of a specific function mode which has been assigned to the pushed setting switch is written directly in the counter of the setting section 2. Then, in a step 28, the function mode of the number written in the counter is displayed in the display section 6.

As can be seen from the foregoing, the radio control transmitter of the present invention is so constructed that a plurality of the setting means each are provided with two functions or the function of immediately calling a specified function mode and the normal setting function, which are changed over through the switching means. Such construction of the present invention permit a desired function mode to be immediately called through a significantly simple operation as well as carries out the normal setting operation. In general, in a radio control transmitter, function modes of which set contents are required to be frequently changed are predetermined. The application of the above-described construction of the present invention to such function modes permits its practical advantages to be further exhibited.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A radio control transmitter for use with a model toy unit, comprising:

a plurality of setting means for selecting desired operation function modes, said setting means being provided at a predetermined position of the radio control transmitter;

a storage means for storing data on the operation function modes in correspondence with said setting means; and a change-over means for switching said setting means between a first and a second selection mode, wherein in the first selection mode data from a particular operation function mode are immediately called up from said storage means upon operation of a respective setting means, and in said second selection mode a plurality of selectable operation function modes are sequentially scrolled by successive operation of one of said setting means in order to select the desired operation function mode in the second selection mode.

2. In a radio control transmitter for use with a model toy unit, the improvement comprising:

a plurality of setting means for selecting desired operation function modes and control functions;

a storage means for storing data defining said operation function modes and said control functions which are set by said plurality of setting means; and, change-over selection means for switching said setting means between first and second selection modes, wherein when said first selection mode is selected, each of said setting means is operable to select and output from said storage means data of a respective operation function mode, and when said second selection mode is selected., some of said setting means are operable to select a respective control function and at least one of said setting means is operable to scroll sequentially a plurality of different operation function modes by successive operation of said at least one setting means in order to select one of said different operation function modes, so that said storage means outputs data of the selected operation function mode and data of selected control functions.

* * * * *